United States Patent
Subrahmanya et al.

(10) Patent No.: US 11,949,316 B2
(45) Date of Patent: Apr. 2, 2024

(54) MOTOR JACKET FOR HVAC SYSTEM

(71) Applicant: Johnson Controls Technology Company, Auburn Hills, MI (US)

(72) Inventors: Praveena Alangar Subrahmanya, Vittal Mudnoor (IN); Deepak Dilipsingh Dixit, Nagpur (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 304 days.

(21) Appl. No.: 17/191,266

(22) Filed: Mar. 3, 2021

(65) Prior Publication Data
US 2022/0286015 A1  Sep. 8, 2022

(51) Int. Cl.
*H02K 5/20* (2006.01)
*F24F 1/24* (2011.01)
*H02K 5/18* (2006.01)

(52) U.S. Cl.
CPC ............. *H02K 5/203* (2021.01); *F24F 1/24* (2013.01); *H02K 5/18* (2013.01)

(58) Field of Classification Search
CPC ............. H02K 5/203; H02K 5/18; F24F 1/24
USPC ........................................................ 62/505
See application file for complete search history.

(56) References Cited

U.S. PATENT DOCUMENTS

| | | | |
|---|---|---|---|
| 5,859,482 A | 1/1999 | Crowell et al. | |
| 6,909,210 B1 | 6/2005 | Bostwick | |
| 7,675,209 B2 | 3/2010 | Masoudipour et al. | |
| 8,183,723 B2 | 5/2012 | Fee et al. | |
| 2013/0189131 A1 | 7/2013 | Huang | |
| 2014/0232218 A1* | 8/2014 | Takano | H02K 5/203 310/53 |

FOREIGN PATENT DOCUMENTS

CN  109756056 A  5/2019

OTHER PUBLICATIONS

Zabdur Rehman and Kwanjae Seong, Three-D Numerical Thermal Analysis of Electric Motor with Cooling Jacket, Energies, Jan. 1, 2018, 16 pages, vol. 11(1), South Korea.
Chan-Bae Park, Thermal Analysis of IPMSM with Water Cooling Jacket for Railway Vehicles, 2014, 6 Pages, J Electr Eng Technol vol. 9.
Bin Zhang, Ronghai Qu, Xinggang Fan, and Jin Wang, Thermal and Mechanical Optimization of Water Jacket of Permanent Magnet Synchronous Machines for EV Application, 2015, 7 Pages.

* cited by examiner

*Primary Examiner* — Steve S Tanenbaum
(74) *Attorney, Agent, or Firm* — Fletcher Yoder, P.C.

(57) ABSTRACT

A heating, ventilation, and/or air conditioning (HVAC) unit includes a motor configured to drive a component of the HVAC unit and a jacket disposed about the motor and comprising a cavity defined by a housing of the jacket. The jacket is configured to receive a flow of working fluid and to place the working fluid in a heat exchange relationship with the motor.

20 Claims, 13 Drawing Sheets

MOTOR JACKET FOR HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. In some embodiments, the HVAC system may include a motor, which may be configured to operate a component of the HVAC system, such as a blower that directs the supply air flow through the HVAC system. However, during operation of the HVAC system, the motor may exchange heat with the supply air flow, thereby affecting the performance and/or efficiency of the HVAC system. For instance, the heat exchange between the motor and the supply air flow may reduce efficiency of the HVAC system to condition the supply air flow.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) unit includes a motor configured to drive a component of the HVAC unit and a jacket disposed about the motor and comprising a cavity defined by a housing of the jacket. The jacket is configured to receive a flow of working fluid and to place the working fluid in a heat exchange relationship with the motor.

In one embodiment, a heating, ventilation, and/or air conditioning (HVAC) unit includes an inlet conduit configured to receive a working fluid and to direct the working fluid to a heat exchanger of the HVAC unit, a motor configured to drive a fan of the HVAC unit, and a jacket disposed about the motor. The jacket includes an inner shell and an outer shell offset from one another define a cavity of the jacket, and the jacket is configured to receive a flow of the working fluid from the inlet conduit into the cavity and to place the motor in a heat exchange relationship with the working fluid.

In one embodiment, a heating, ventilation, and/or air conditioning (HVAC) unit includes an inlet conduit configured to direct a working fluid to a heat exchanger of the HVAC unit, a motor configured to drive operation of a component of the HVAC unit, a jacket disposed about the motor and comprising a cavity defined by a housing of the jacket, and an additional conduit fluidly coupling the cavity of the jacket with the inlet conduit. The additional conduit is configured to direct the working fluid from the inlet conduit into the cavity.

DRAWINGS

Various aspects of this disclosure may be better understood upon reading the following detailed description and upon reference to the drawings in which.

DETAILED DESCRIPTION

Figure 1:
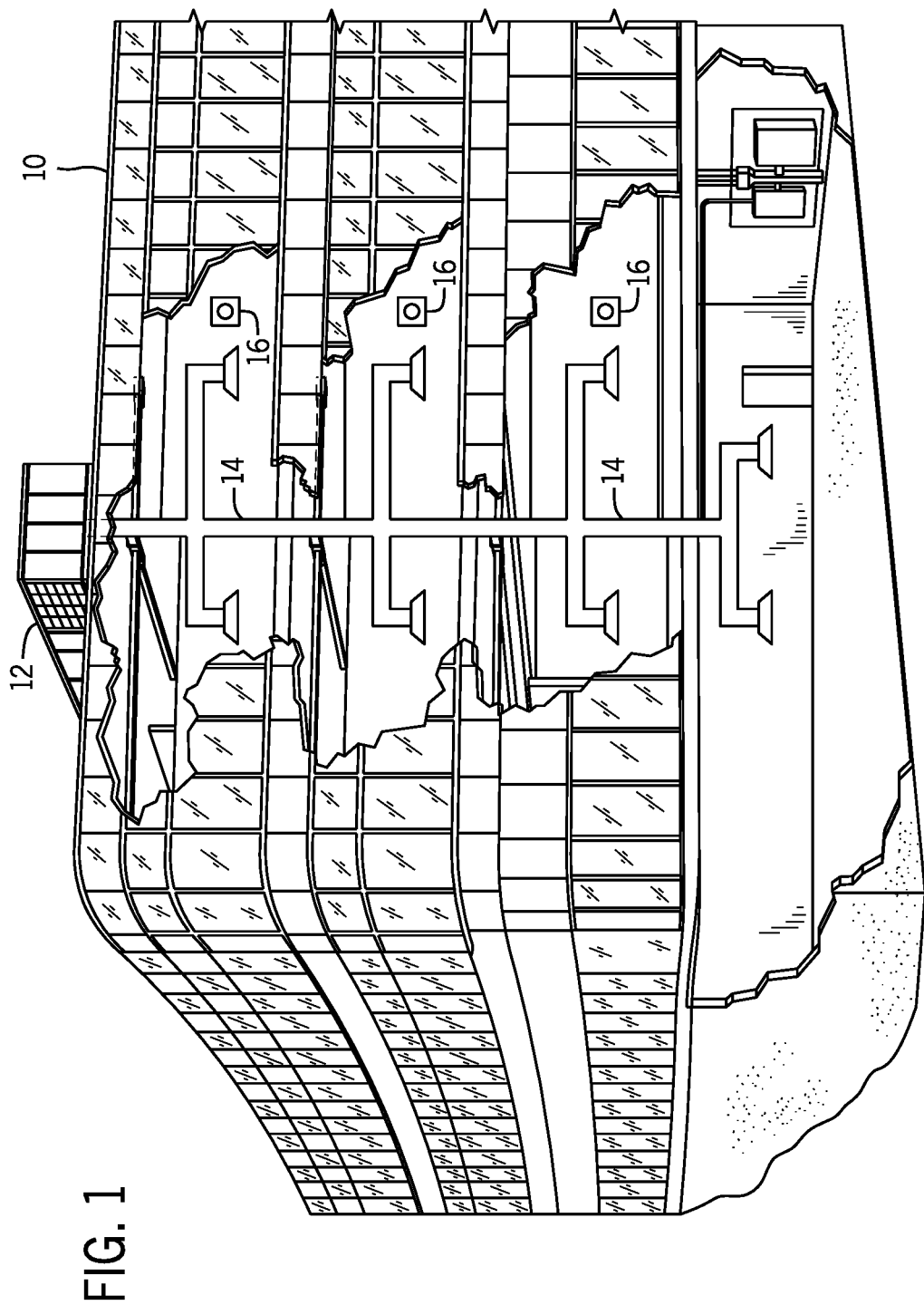
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a vapor compression circuit through which a refrigerant is directed. The vapor compression circuit may place the refrigerant in a heat exchange relationship with a supply air flow to condition (e.g., cool, heat) the supply air flow. The conditioned supply air flow may then be delivered to a space to condition the space. The HVAC system may include a motor configured to operate a component of the HVAC system. For example, the motor may drive a fan or blower to direct the supply air flow through the HVAC system and toward the space.

In some embodiments, the motor may be positioned in or adjacent to a flow path of the supply air flow. For instance, the supply air flow may be directed across the motor during operation of the HVAC system. Thus, the supply air flow may exchange heat with the motor. The heat exchange between the supply air flow and the motor may impact performance of the HVAC system, such as by reducing an efficiency with which the HVAC system conditions the supply air flow. As an example, in a cooling mode of the HVAC system in which the supply air flow is cooled, the supply air flow may absorb heat from the motor, thereby reducing the cooling provided by the supply air flow to condition the space. As another example, in a heating mode of the HVAC system in which the supply air flow is heated, the motor may absorb heat from the supply air flow, which may reduce efficiency of the motor performance (e.g., to direct the supply air flow to the space at a sufficient flow rate).

Accordingly, embodiments of the present disclosure are directed to reducing the impact of heat exchange between the supply air flow and the motor on performance of the HVAC system. For instance, a jacket may be disposed about (e.g., enclose, surround) the motor. The jacket may receive a working fluid (e.g., water) and place the working fluid in a heat exchange relationship with the motor. By way of example, the working fluid may absorb heat from the motor, thereby reducing a temperature of the motor. By reducing the temperature of the motor, heat transfer from the motor to the supply air flow in the cooling mode of the HVAC system may also be reduced. Additionally or alternatively, the working fluid may mitigate effects associated with heat transfer from the supply air flow to the motor in the heating mode of the HVAC system. In this manner, the jacket may improve performance of the HVAC system to condition the supply air flow.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
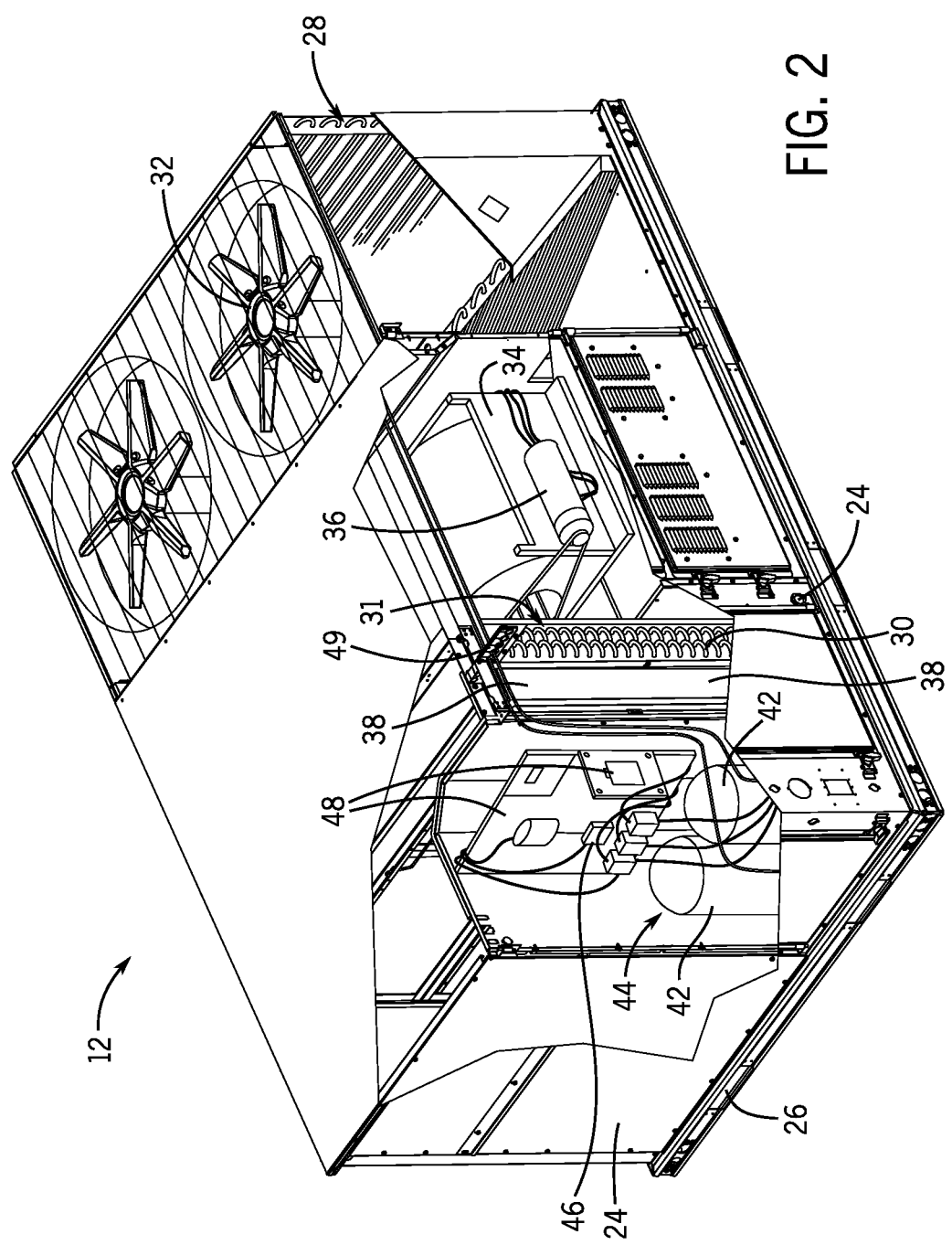
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
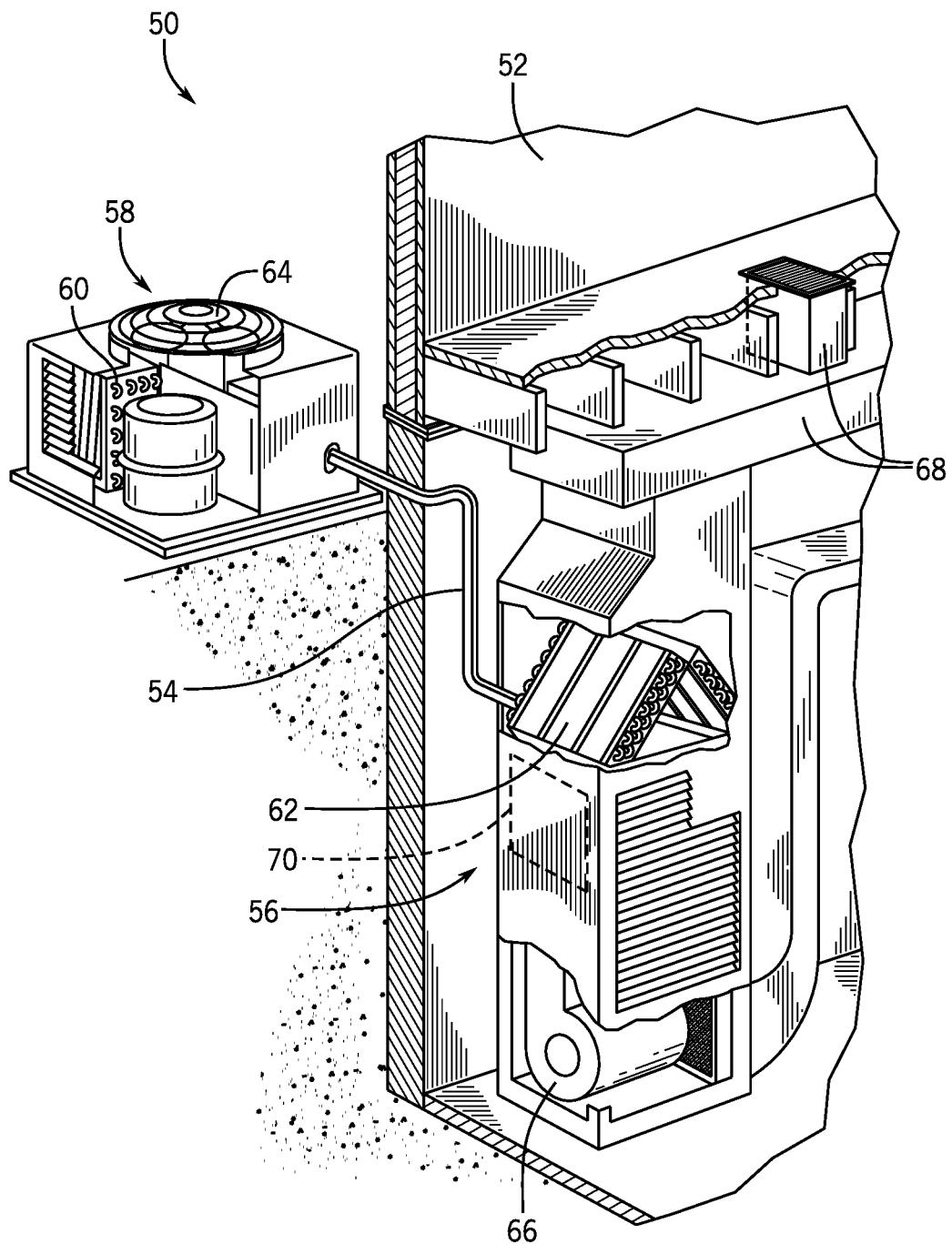
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
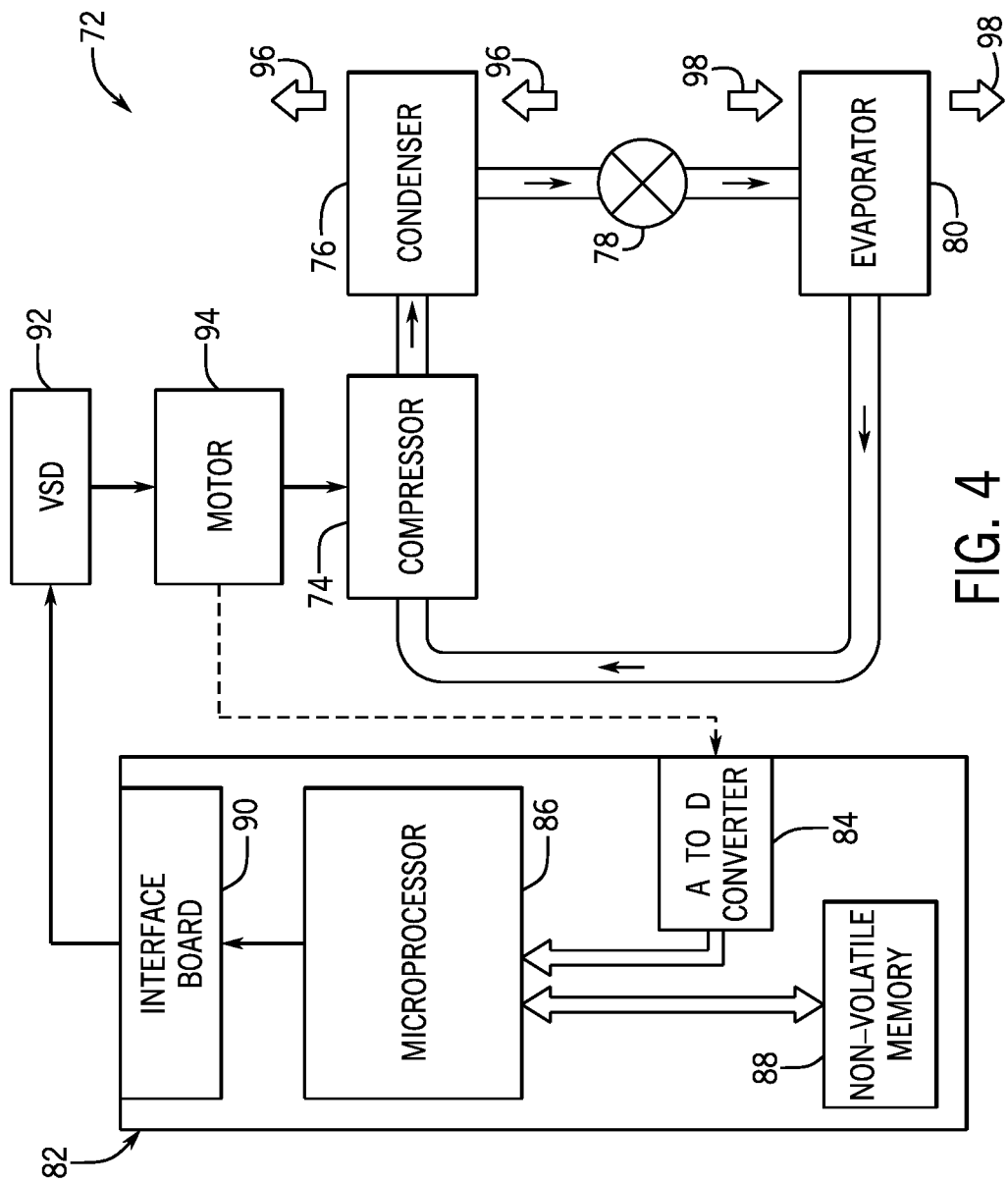
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system configured to condition a supply air flow and to deliver the supply air flow to a space to condition the space. The HVAC system may include a motor positioned within or adjacent to an air flow path along which the supply air flow is directed. Thus, the motor may exchange heat with the supply air flow during operation of the HVAC system. The HVAC system also includes a jacket configured to be disposed about the motor. The jacket may receive a working fluid or a cooling fluid and may place the motor in a heat exchange relationship with the motor. The working fluid may absorb heat from the motor to reduce a temperature of the motor and improve performance of the HVAC system. For example, in a cooling mode of the HVAC system, the working fluid may reduce heat transfer from the motor to the supply air flow, thereby improving a cooling capacity of the supply air flow. In a heating mode of the HVAC system, the working fluid may reduce an impact of heat transfer from the supply air flow to the motor, such as by providing a thermal barrier therebetween, thereby improving performance of the motor. For instance, the jacket may improve efficiency of operation of the motor, such as by reducing energy consumption associated with operation of the motor.

Figure 5:
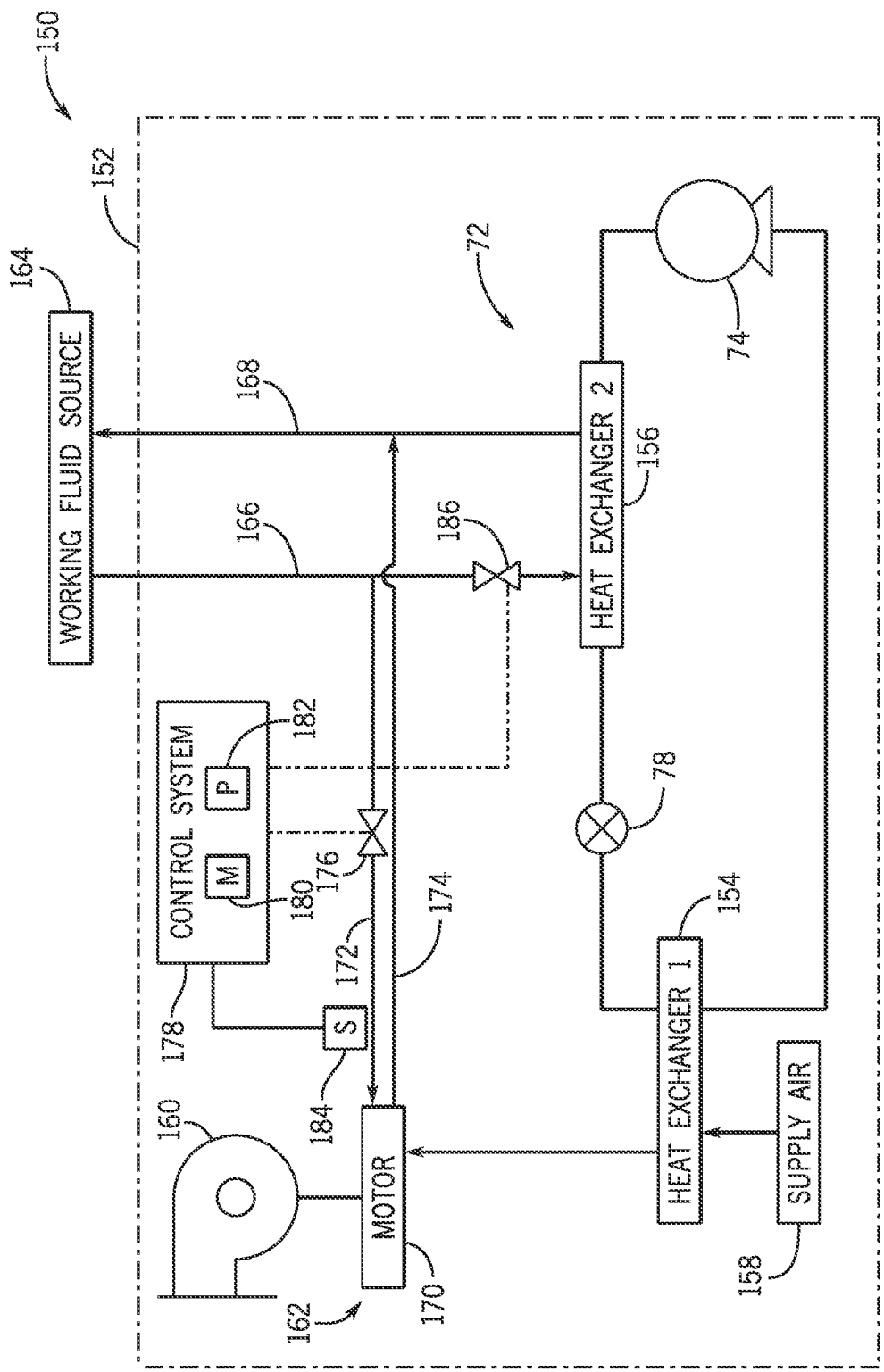
FIG. 5 is a schematic diagram of an embodiment of an HVAC system having a motor and a jacket disposed about the motor, in accordance with an aspect of the present disclosure.

With this in mind, FIG. 5 is a schematic diagram of an embodiment of an HVAC system 150. In some embodiments, the HVAC system 150 may include an RTU or a self-contained unit having a housing 152 (e.g., a single housing). In additional or alternative embodiments, the housing 152 may be a part of multiple housings of the HVAC system 150, such as for a split HVAC system. The HVAC system 150 may include one or more components of the vapor compression system 72 disposed within the housing 152. For example, the housing 152 may enclose the compressor 74, the expansion valve 78, a first heat exchanger 154, and/or a second heat exchanger 156. During operation of the HVAC system 150, the vapor compression system 72 may circulate a refrigerant to condition a supply air flow 158 (e.g., a return air flow, an ambient air flow, an outdoor air flow), which may be directed across the first heat exchanger 154. The HVAC system 150 may also include a fan or blower 160 and a motor 162 configured to operate the fan 160. For instance, the motor 162 may be configured to cause the fan 160 to direct (e.g., force, draw) the supply air flow 158 across the first heat exchanger 154 to place the refrigerant in a heat exchange relationship with the supply air flow 158 to condition the supply air flow 158. Additionally or alternatively, the motor 162 may be configured to operate another component of the HVAC system 150, such as the compressor 74 and/or another fan of the HVAC system 150.

In some embodiments, the HVAC system 150 may be operated in a cooling mode whereby the vapor compression system 72 directs cooled refrigerant through the first heat exchanger 154. As an example, the second heat exchanger 156 may receive heated, pressurized refrigerant from the compressor 74 and may cool the heated, pressurized refrigerant. The first heat exchanger 154 may receive the cooled refrigerant and may place the cooled refrigerant in a heat exchange relationship with the supply air flow 158 to cause the refrigerant to absorb heat from the supply air flow 158, thereby cooling the supply air flow 158. In the illustrated embodiment, the second heat exchanger 156 is fluidly coupled to a working fluid source 164. The second heat exchanger 156 may receive a working fluid, such as water, anti-freeze, and/or a methanol mixture, from the working fluid source 164 via an inlet conduit 166 and may place the working fluid in a heat exchange relationship with the refrigerant. The working fluid may absorb heat from the refrigerant to cool the refrigerant and heat the working fluid. The second heat exchanger 156 may then direct the heated working fluid to the working fluid source 164 via an outlet conduit 168 for the working fluid source 164 to cool the working fluid and re-circulate the cooled working fluid to the second heat exchanger 156. By way of example, the working fluid source 164 may include a cooling tower, a chiller, a separate vapor compression system, another suitable source, or any combination thereof. Although the working fluid source 164 is positioned external to the housing 152 in the illustrated embodiment, the working fluid source 164 may be positioned within the housing 152 in additional or alternative embodiments. Further, in additional or alternative embodiments, the second heat exchanger 156 may cool the refrigerant using a different technique. As an example, the second heat exchanger 156 may cool the refrigerant using an air flow (e.g., directed across the second heat exchanger 156 using another fan), such as an ambient air flow, an outdoor air flow, a return air flow, and/or any other suitable air flow.

Additionally or alternatively, the vapor compression system 72 may be operated in a heating mode to heat the supply air flow 158. For example, the HVAC system 150 may include a heat pump in which the compressor 74 may direct the heated, pressurized refrigerant to the first heat exchanger 154 instead of to the second heat exchanger 156. In this way, the refrigerant may transfer heat to the supply air flow 158 directed across the first heat exchanger 154, thereby heating the supply air flow 158. Additionally or alternatively, the HVAC system 150 may include a furnace (e.g., a burner, an electric coil) configured to heat the supply air flow 158 separately from the first heat exchanger 154.

The fan 160 may direct the conditioned supply air flow 158 out of the housing 152 and toward the space conditioned by the HVAC system 150. In certain embodiments, the motor 162 may be disposed within or adjacent to an air flow path of the supply air flow 158, such as downstream of the first heat exchanger 154 relative to a direction of the supply air flow 158 through the HVAC system 150. For instance, a portion of the supply air flow 158 may flow across the motor 162 prior to exiting the housing 152. As such, the supply air flow 158 and the motor 162 may exchange heat with one another, which may affect performance of the HVAC system 150. For this reason, a jacket 170 may be disposed about the motor 162 to mitigate heat exchange between the supply air flow 158 and the motor 162. The jacket 170 may, for example, surround or enclose a portion of the motor 162. In this way, the jacket 170 may reduce a temperature of the motor 162 and/or provide a thermal barrier between the motor 162 and the supply air flow 158. For instance, the jacket 170 may include a housing that defines a cavity or internal volume configured to receive the working fluid from the working fluid source 164. The housing of the jacket 170 may place the working fluid in a heat exchange relationship with the motor 162 to absorb heat from the motor 162.

In the illustrated embodiment, the jacket 170 is fluidly coupled to the inlet conduit 166 via a first conduit 172. Thus, a portion of the working fluid flowing through the inlet conduit 166 (e.g., toward the second heat exchanger 156) may be diverted to the jacket 170. Further, the jacket 170 may be fluidly coupled to the outlet conduit 168 via a second conduit 174. As such, the working fluid may be directed from the jacket 170 to the outlet conduit 168 and to the working fluid source 164, such as after exchanging heat with the motor 162. Although the jacket 170 is configured to receive a portion of the working fluid from the working fluid source 164 that is fluidly coupled to the second heat exchanger 156 in the illustrated embodiment, the jacket 170 may be configured to receive a working fluid from a source that does not provide working fluid to the second heat exchanger 156. For example, the jacket 170 may receive working fluid from a dedicated source configured to direct the working fluid to the jacket 170.

The jacket 170 may improve performance of the HVAC system 150. For example, in the cooling mode, the jacket 170 may cool the motor 162 via the working fluid and reduce an amount of heat transfer from the motor 162 to the supply air flow 158. As such, a cooling capacity of the supply air flow 158 may be increased to improve cooling provided to the space via the supply air flow 158. In the heating mode, the jacket 170 may cool the motor 162 via the working fluid and reduce or mitigate a temperature increase caused by heat transfer from the supply air flow 158 to the motor 162. In other words, the jacket 170 may reduce heating of the motor 162. Thus, performance of the motor 162 may be improved. For example, the motor 162 may operate more efficiently to direct the supply air flow 158 at a sufficient or desirable rate via the fan 160 (e.g., without overheating). In certain embodiments, the jacket 170 may be a component that is separate from the motor 162. That is, the jacket 170 may be separately manufactured from the motor 162 and may be coupled to the motor 162 in an installed configuration. In additional or alternative embodiments, the jacket 170 may be integral to the motor 162. In other words, the jacket 170 may be integrally formed as a component or feature of the motor 162.

In some embodiments, a first valve 176 may be disposed along the first conduit 172 to control a flow of the working fluid directed to the jacket 170 via the first conduit 172. As an example, the first valve 176 may be configured to transition between a fully open (e.g., on) position that enables full flow of the working fluid into the jacket 170 and a fully closed (e.g., off) position that blocks flow of the working fluid into the jacket 170. The first valve 176 may also be configured to transition to one or more intermediate positions between the fully open position and the fully closed position to direct a particular amount (e.g., a specific flow rate) of working fluid into the jacket 170. For instance, the first valve 176 may be positioned to direct working fluid into the jacket 170 at a flow rate between 0 gallons per minute (gpm) and 3 gpm, between 0 gpm and 5 gpm, between 0 gpm and 10 gpm, or any other suitable range of flow rates.

The illustrated HVAC system 150 also include a control system 178 (e.g., control circuitry, an electronic controller) that is communicatively coupled to the first valve 176. The control system 178 may include a memory 180 and processing circuitry 182. The memory 180 may include a tangible, non-transitory, computer-readable medium that may store instructions that, when executed by the processing circuitry 182, may cause the processing circuitry 182 to perform various functions or operations described herein. To this end, the processing circuitry 182 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. As an example, the control system 178 may be configured to control the position of the first valve 176 to control flow of the working fluid directed to the jacket 170. That is, the control system 178 may be configured to adjust the first valve 176 between the fully open position, the fully closed position, and/or the intermediate position(s).

In certain embodiments, the control system 178 may be communicatively coupled to a sensor 184, which may be configured to determine an operating parameter associated with the HVAC system 150. The sensor 184 may transmit data indicative of the operating parameter to the control system 178, and the control system 178 may control operation of one or more components of the HVAC system 150 based on the data received from the sensor 184. For instance, the control system 178 may operate the first valve 176 based on the data to control fluid flow into the jacket 170. The operating parameter may include a temperature of the motor 162, a temperature of the working fluid, a temperature of the supply air flow 158, an opening (e.g., an opening size) of the first valve 176, a flow rate of the working fluid through the first conduit 172, another suitable parameter, or any combination thereof. In an example, the control system 178 may increase a size of the opening of the first valve 176, thereby increasing a flow rate of the working fluid into the jacket 170, in response to a determined increase of the temperature of the motor 162 (e.g., the temperature of the motor 162 exceeding a threshold) indicated by the data received from the sensor 184. Thus, the control system 178 may increase cooling of the motor 162 via the working fluid based on the determined temperature increase of the motor 162. The control system 178 may also reduce the size of the opening of the first valve 176, thereby reducing the flow rate of the working fluid into the jacket 170, in response to a determined decrease of the temperature of the motor 162. For instance, reducing the size of the opening of the first valve 176 may increase the flow rate of the working fluid to the second heat exchanger 156 to increase efficiency of the second heat exchanger 156 to cool the refrigerant. In another example, the control system 178 may increase the size of the opening of the first valve 176 based on a determination that the supply air flow 158 is below a first threshold temperature (e.g., in the cooling mode) or that the supply air flow 158 is above a second threshold temperature (e.g., in the heating mode) to mitigate the impact of heat exchange between the motor 162 and the supply air flow 158 on performance of the HVAC system 150.

In additional or alternative embodiments, a second valve 186 may be disposed along the inlet conduit 166 and may control flow of working fluid to the second heat exchanger 156. For example, the second valve 186 may transition between a fully open (e.g., on) position to enable full flow of working fluid to the second heat exchanger 156, a fully closed (e.g., off) position to block flow of working fluid to the second heat exchanger 156, or any position between the fully open position and the fully closed position. The second valve 186 may be positioned such that, when the second valve 186 is in the fully closed position, the jacket 170 may still receive the working fluid via the first conduit 172. That is, the jacket 170 may receive working fluid from the working fluid source 164 while flow of working fluid to the second heat exchanger 156 is blocked via the second valve 186. In some embodiments, the control system 178 may be communicatively coupled to the second valve 186 and may control the positioning of the second valve 186. Thus, the control system 178 may control a flow rate of the working fluid to the second heat exchanger 156, such as to control cooling of the refrigerant via the second heat exchanger 156.

Figure 6:
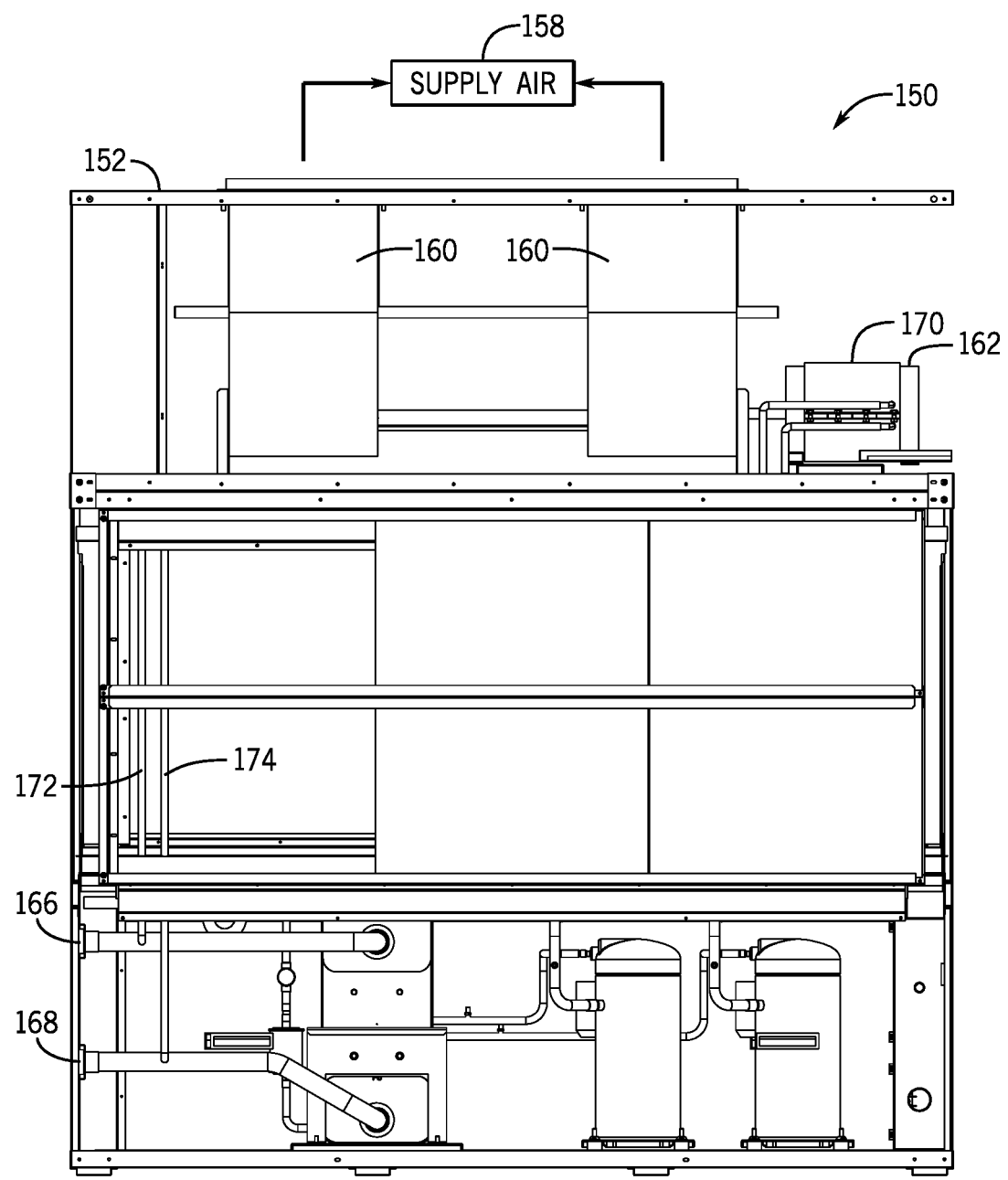
FIG. 6 is a cutaway side view of an embodiment of an HVAC system having a motor and a jacket disposed about the motor, in accordance with an aspect of the present disclosure.

FIG. 6 is a cutaway side view of an embodiment of the HVAC system 150. Certain walls of the housing 152 of the HVAC system 150 are hidden to illustrate various interior components of the HVAC system 150. In the illustrated embodiment, each of the inlet conduit 166 and the outlet conduit 168 extends to or beyond the housing 152 (e.g., into an external environment). Thus, the working fluid source 164 may be readily fluidly coupled to the conduits 166, 168, such as via corresponding conduits, tubing, and/or ports. The first conduit 172 may extend between the inlet conduit 166 and the jacket 170 (e.g., an inlet port of the jacket 170), and the second conduit 174 may extend between the outlet conduit 168 and the jacket 170 (e.g., an outlet port of the jacket 170), thereby enabling flow of working fluid between the jacket 170 and the working fluid source 164.

In the illustrated embodiment, the HVAC system 150 includes the motor 162 and the jacket 170 positioned adjacent to two fans 160, and the motor 162 may operate the fans 160 to direct the supply air flow 158 through the HVAC system 150. For instance, during operation of the fans 160, an intake air flow may be directed into the housing 152 (e.g., at a bottom section of the housing 152, at a middle section of the housing 152, at a top section of the housing 152) for conditioning via the first heat exchanger 154. Thereafter, the fans 160 may direct the intake air flow as the supply air flow 158 out of the housing 152 for conditioning of the space. A portion of the supply air flow 158 may be directed across the motor 162, and the jacket 170 may mitigate the impact of heat exchange between the motor 162 and the supply air flow 158 to improve performance of the HVAC system 150. Although the fans 160, the motor 162, and the jacket 170 are positioned at a top section of the housing 152 in the illustrated embodiment, the fans 160, the motor 162, and/or the jacket 170 may be positioned at any suitable section within the housing 152 in additional or alternative embodiments.

Figure 7:
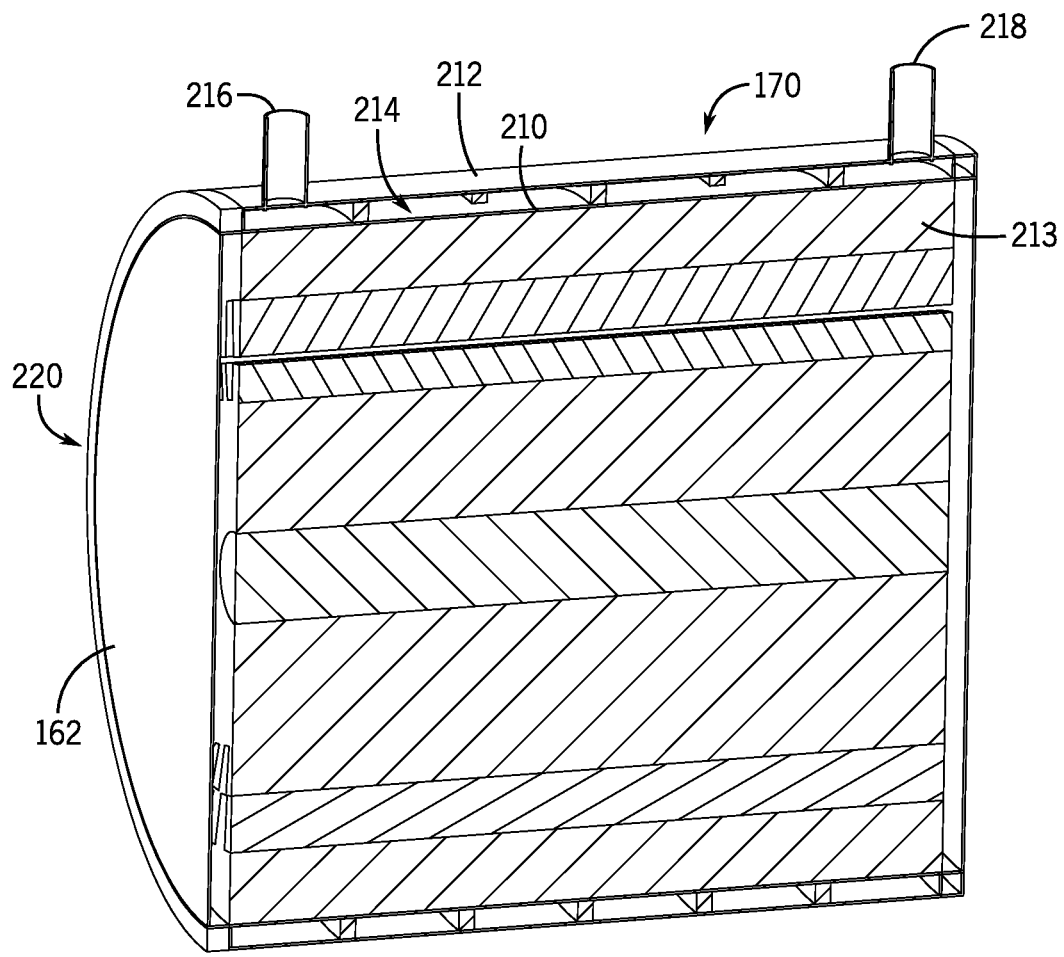
FIG. 7 is a perspective cross-sectional view of an embodiment of a motor with a jacket disposed about the motor, in accordance with an aspect of the present disclosure.

FIG. 7 is a perspective cross-sectional view of an embodiment of the motor 162 and the jacket 170. In the illustrated embodiment, the motor 162 has a cylindrical shape, and the jacket 170 has a similar or corresponding shape to match that of the motor 162. However, the motor 162 and the jacket 170 may have any suitable shape in an additional or an alternative embodiment. The jacket 170 may include or define a housing having an inner shell 210 and an outer shell 212 that are offset (e.g., radially offset) from one another to define a cavity or an internal volume 214. The working fluid received from the working fluid source 164 may flow into and through (e.g., fill) the cavity 214. For example, the outer shell 212 of the jacket 170 may include an inlet port 216 (e.g., an inlet) formed therein, which may be fluidly coupled to the first conduit 172 and/or the inlet conduit 166. Accordingly, the inlet port 216 may receive the working fluid from the working fluid source 164. The received working fluid may flow through the cavity 214 toward an outlet port 218 (e.g., an outlet) of the outer shell 212. The outlet port 218 may be fluidly coupled to the second conduit 174 and/or the outlet conduit 168. Accordingly, the outlet port 218 may discharge the working fluid from the cavity 214 to be directed back to the working fluid source 164.

The inner shell 210 and/or the outer shell 212 may form an opening 220 (e.g., a void) through which the motor 162 may be inserted to assemble the jacket 170 with the motor 162. In other words, the motor 162 may be positioned within the opening 220 such that the jacket 170 extends about the motor 162. In the assembled configuration, the working fluid within the cavity 214 may be placed in a heat exchange relationship with the motor 162 via the inner shell 210, which may be in contact with the motor 162 (e.g., an outer housing 213 of the motor 162) in the assembled configuration. That is, heat may transfer from the motor 162, to the inner shell 210, and to the working fluid within the cavity 214. Thus, working fluid directed out of the cavity 214 (e.g., via the outlet port 218) may transfer heat away from the motor 162, and working fluid entering the cavity 214 (e.g., via the inlet port 216) may absorb additional heat from the motor 162 to cool the motor 162.

Figure 8:
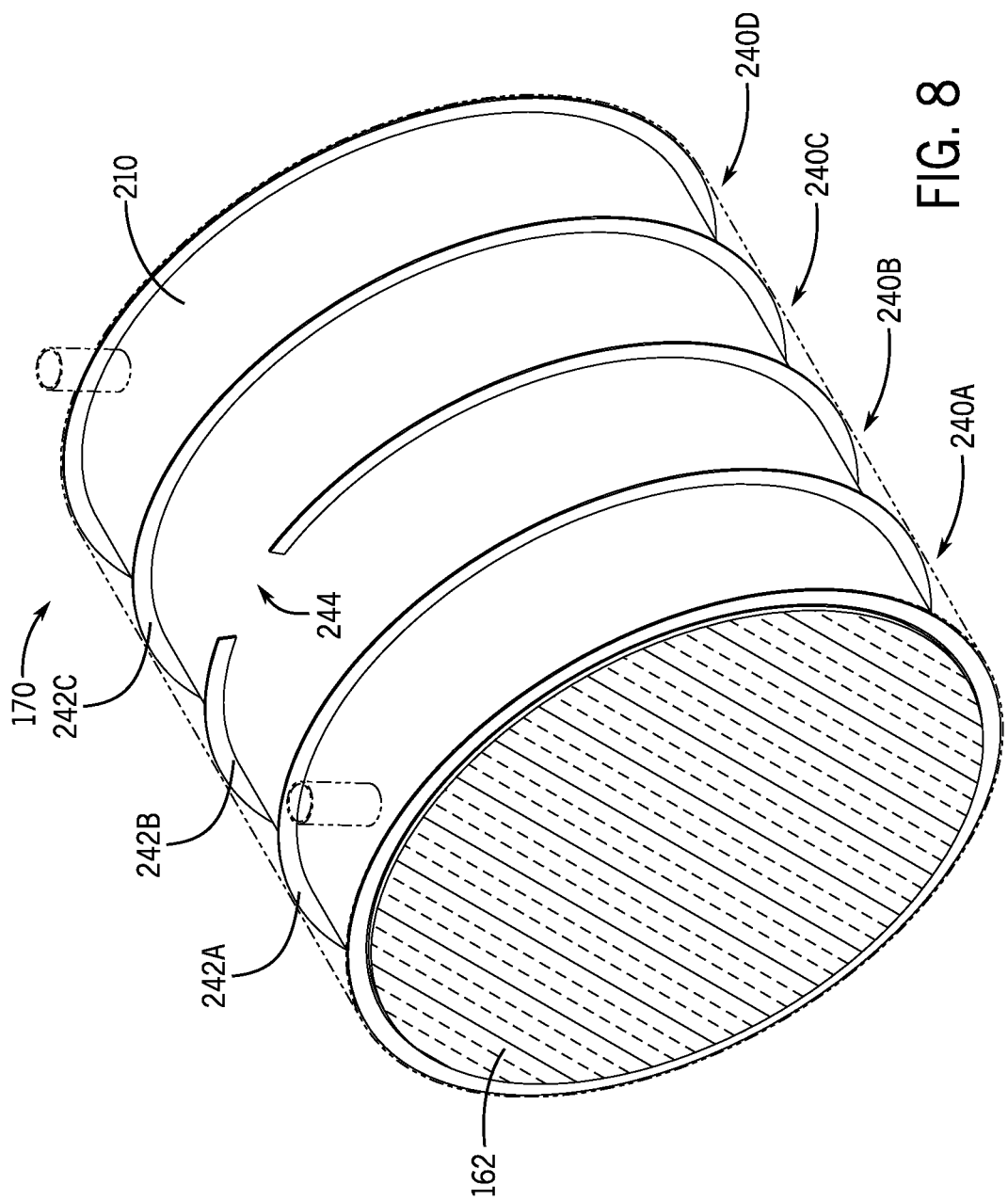
FIG. 8 is a perspective view of an embodiment of a motor with a jacket disposed about the motor, in accordance with an aspect of the present disclosure.

FIG. 8 is a perspective view of an embodiment of the motor 162 and the jacket 170. The outer shell 212 of the jacket 170 is not visible in FIG. 8 to more clearly illustrate the interior of the jacket 170. The jacket 170 may include multiple passes 240 through which the working fluid may be directed to provide cooling to the motor 162. As described herein, each pass 240 directs the working fluid along a separate portion of the inner shell 210. In the illustrated embodiment, a first pass 240A may direct the working fluid circumferentially about a first portion of the inner shell 210, a second pass 240B may direct the working fluid circumferentially about a second portion of the inner shell 210, a third pass 240C may direct the working fluid circumferentially about a third portion of the inner shell 210, and a fourth pass 240D may direct the working fluid circumferentially about a fourth portion of the inner shell 210. Partitions 242 may be positioned to define and separate the passes 240 from one another. The partitions 242 may be coupled to the inner shell 210, the outer shell 212, or both, and may extend radially (e.g., relative to a central axis of the jacket 170) between the inner shell 210 and the outer shell 212. For example, a first partition 242A may define the first pass 240A and the second pass 240B, a second partition 242B may define the second pass 240B and the third pass 240C, and a third partition 242C may define the third pass 240C and the fourth pass 240D. In additional or alternative embodiments, any suitable number of passes 240 defined by a corresponding number of partitions 242, such as five passes, six passes, seven passes, eight passes, nine passes, or ten or more passes, may be included in the jacket 170.

Each partition 242 may block flow of the working fluid between the passes 240 at certain sections along the inner shell 210. In other words, the partitions 242 may force the working fluid to flow along a portion of the inner shell 210 to transition between passes 240 (e.g., sequentially through the first pass 240A, second pass 240B, third pass 240C, and fourth pass 240D). As an example, each of the partitions 242 may fully extend between (e.g., abut) the inner shell 210 and the outer shell 212 to block undesirable flow of working fluid across (e.g., over, through) the partitions 242. Further, each of the partitions 242 may include a respective opening or slot 244 to enable flow of the working fluid between the passes 240 (e.g., adjacent passes 240). The openings 244 may be positioned (e.g., offset) relative to one another to force the working fluid to flow along a portion of the inner shell 210 within each pass 240 to transition to an adjacent pass 240. The direction of the working fluid through multiple passes 240 may increase heat exchange between the working fluid and the motor 162. Indeed, the working fluid may continually absorb heat from the motor 162 while flowing along each of the passes 240. In some embodiments, the partitions 242 may be positioned to force the working fluid to flow through the passes 240 sequentially. That is, for example, the working fluid may be forced to flow along the first pass 240A, then along the second pass 240B, then along the third pass 240C, and finally along the fourth pass 240D.

In additional or alternative embodiments, the partitions 242 may be positioned to enable the working fluid to flow through certain passes 240 in parallel with one another. As an example, the working fluid may be split into a first portion and a second portion. The first portion of the working fluid may flow between the second pass 240B and the third pass 240C, and the second portion of the working fluid may flow between the first pass 240A and the third pass 240C without flowing along the second pass 240B. The first portion and the second portion of the working fluid may then combine at the third pass 240C. Moreover, although each of the partitions 242 and passes 240 extends along the circumference of the inner shell 210 in the illustrated embodiment, any of the partitions 242 and/or the passes 240 may extend along a different part of the inner shell 210 in additional or alternative embodiments. For example, one of the partitions 242 may extend along a length of the motor 162 to direct flow of the working fluid along the length to transition between different passes 240.

The partitions 242 may also increase heat exchange between the motor 162 and the working fluid within the cavity 214. For example, the partitions 242 may increase a surface area of heat transfer between the working fluid and the motor 162. Indeed, the partitions 242 may increase heat transfer from the motor 162 to the jacket 170 and from the jacket 170 to the working fluid. Thus, the partitions 242 may improve cooling of the motor 162 and further improve performance of the HVAC system 150.

Figure 9:
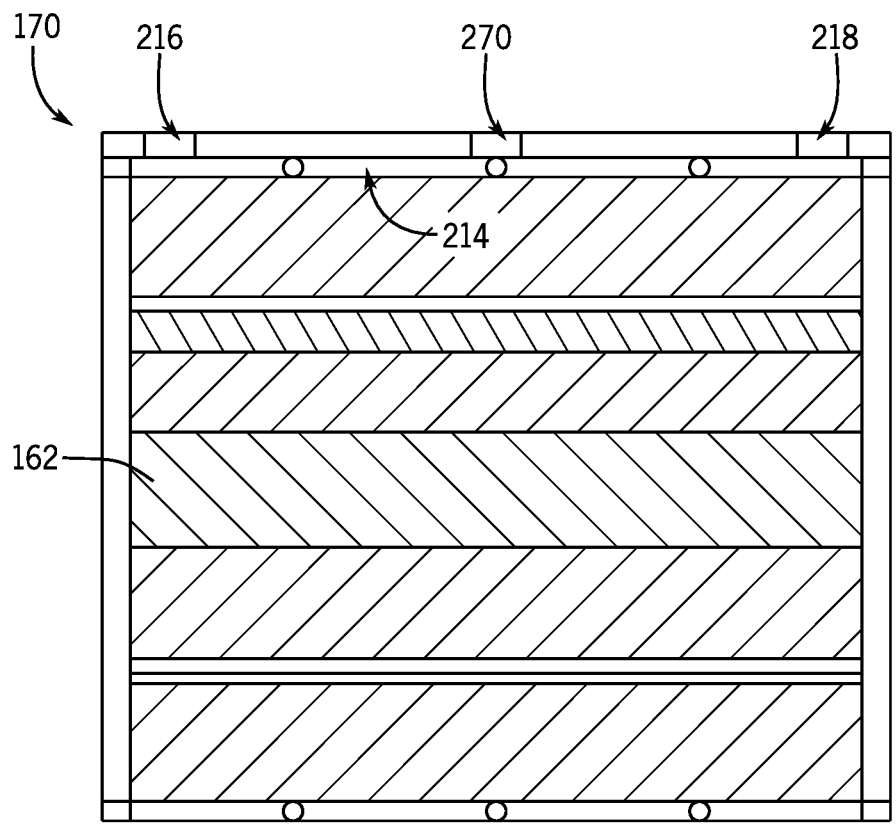
FIG. 9 is a side cross-sectional view of an embodiment of a motor with a jacket disposed about the motor, in accordance with an aspect of the present disclosure.

FIG. 9 is a side cross-sectional view of an embodiment of the motor 162 and the jacket 170. The illustrated jacket 170 includes the inlet port 216, the outlet port 218, and an additional port 270. In some embodiments, the additional port 270 may be an additional inlet port (e.g., fluidly coupled to the inlet conduit 166) configured to receive the working fluid from the working fluid source 164. In additional or alternative embodiments, the additional port 270 may be an additional outlet port (e.g., fluidly coupled to the outlet conduit 168) configured to discharge the working fluid from the cavity 214. Indeed, the jacket 170 may include multiple inlet ports 216 and/or multiple outlet ports 218 to enable greater flow of the working fluid into and/or out of the cavity 214. Such inlet ports 216 and/or outlet ports 218 may be positioned at any suitable location relative to one another. For example, the ports 216, 218, 270 may be offset from one another along the circumference of the jacket 170. Additionally or alternatively, the ports 216, 218, 270 may be ordered in a different manner. For instance, ports 216, 218 may be outlet ports and port 270 may be an inlet port, ports 216, 218 may be inlet ports and port 270 may be an outlet port, or the inlet ports 216, outlet ports 218, and/or additional ports 270 may be positioned in any suitable order along the length of the jacket 170 and may be configured to receive and/or discharge flow of working fluid in any suitable configuration.

Figure 10:
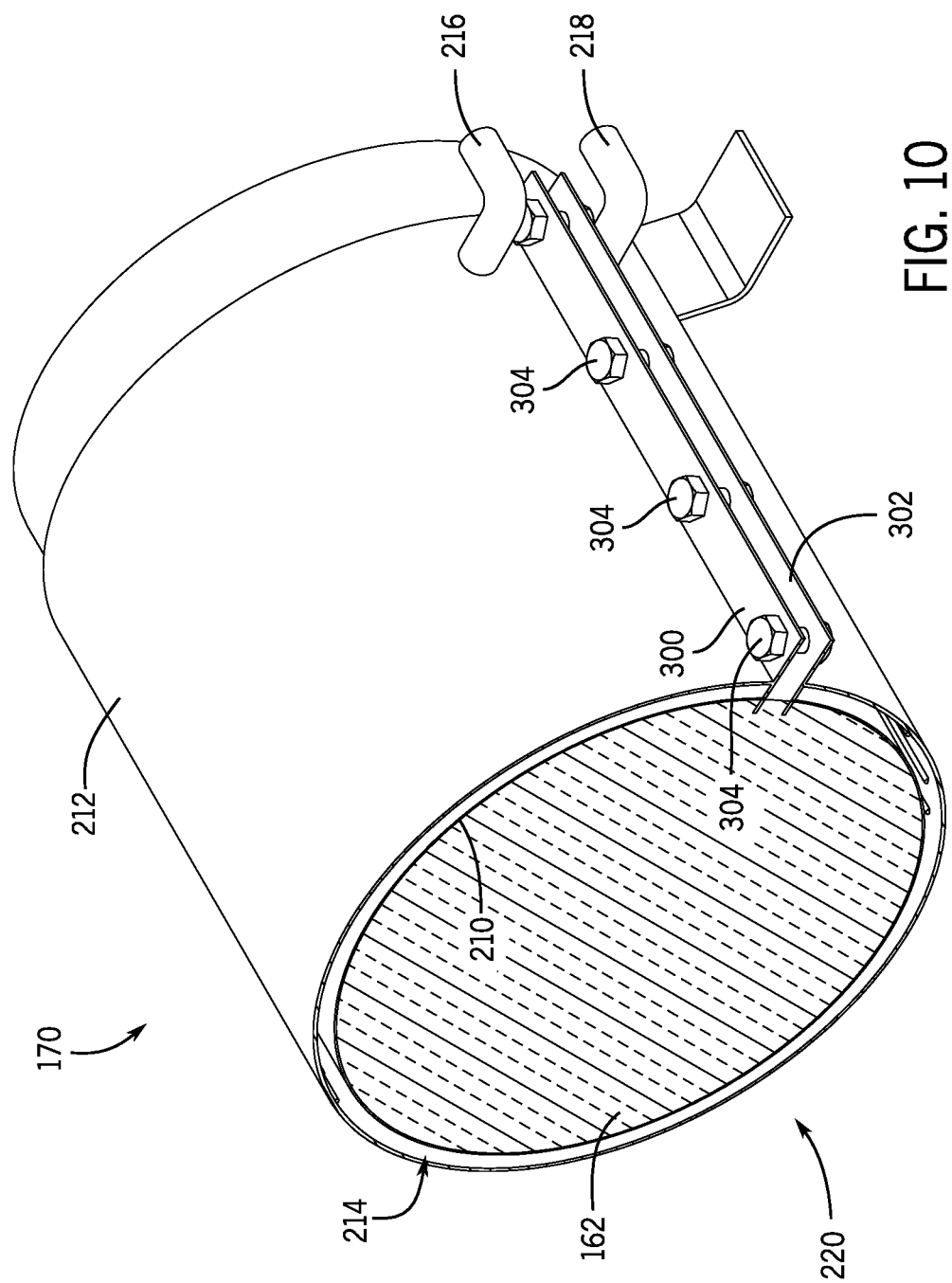
FIG. 10 is a perspective cross-sectional view of an embodiment of a motor with a jacket disposed about the motor, in accordance with an aspect of the present disclosure.

FIG. 10 is a perspective cross-sectional view of an embodiment of the motor 162 and the jacket 170 illustrating an assembly of the motor 162 and the jacket 170. In the illustrated embodiment, the jacket 170 includes a first end 300 (e.g., a first circumferential end) and a second end 302 (e.g., a second circumferential end). The ends 300, 302 may be movable relative to one another to define a size of the opening 220. As an example, the first end 300 and the second end 302 may be moved away from one another to increase the size of the opening 220, thereby enabling the motor 162 to be inserted into the opening 220 more easily to facilitate establishment of the assembled configuration of the jacket 170. Further, the first end 300 and the second end 302 may be compressed toward one another to reduce the size of the opening 220. For instance, each of the first end 300 and the second end 302 may have a respective flat portion configured to be compressed or biased toward one another to compress the inner shell 210 of the jacket 170 against the motor 162, thereby securing the jacket 170 about the motor 162 in the assembled configuration. In this manner, the jacket 170 may accommodate and be secured to differently-sized motors 162 (e.g., motors 162 having different circumferences).

In certain embodiments, fasteners 304 may be used to compress or bias the first end 300 and the second end 302 toward one another to secure the jacket 170 about the motor 162. For example, each of the ends 300, 302 may include respective openings that align with one another. A nut may abut one of the ends 300, 302 such that an opening of the nut aligns with corresponding openings of the ends 300, 302. One of the fasteners 304 may be inserted through the corresponding openings of the ends 300, 302 and may abut against another of the ends 300, 302 opposite that abutted by the nut. The fastener 304 may also engage (e.g., threadably engage) with the nut (e.g., the opening of the nut), and the fastener 304 and the nut may be tightened to compress or bias the ends 300, 302 toward one another. In additional or alternative embodiments, any suitable component or technique may be used to compress the ends 300, 302 toward one another to secure the jacket 170 onto the motor 162. By way of example, a clamp, a latch, an adhesive, another suitable component, or any combination thereof, may be used to compress and bias the ends 300, 302 toward one another.

In the illustrated embodiment, the ports 216, 218 may be fluidly coupled to the jacket 170 adjacent to the respective ends 300, 302. Accordingly, the working fluid may enter the cavity 214 at one of the ends 300, 302, and the working fluid may be discharged from the cavity 214 at another of the ends 300, 302. In additional or alternative embodiments, the ports 216, 218 may be coupled to the jacket 170 at the same end 300, 302. In further embodiments, there may be multiple ports 216, 218 coupled to the jacket 170 at any suitable location, such as adjacent to any of the ends 300, 302.

Figure 11:
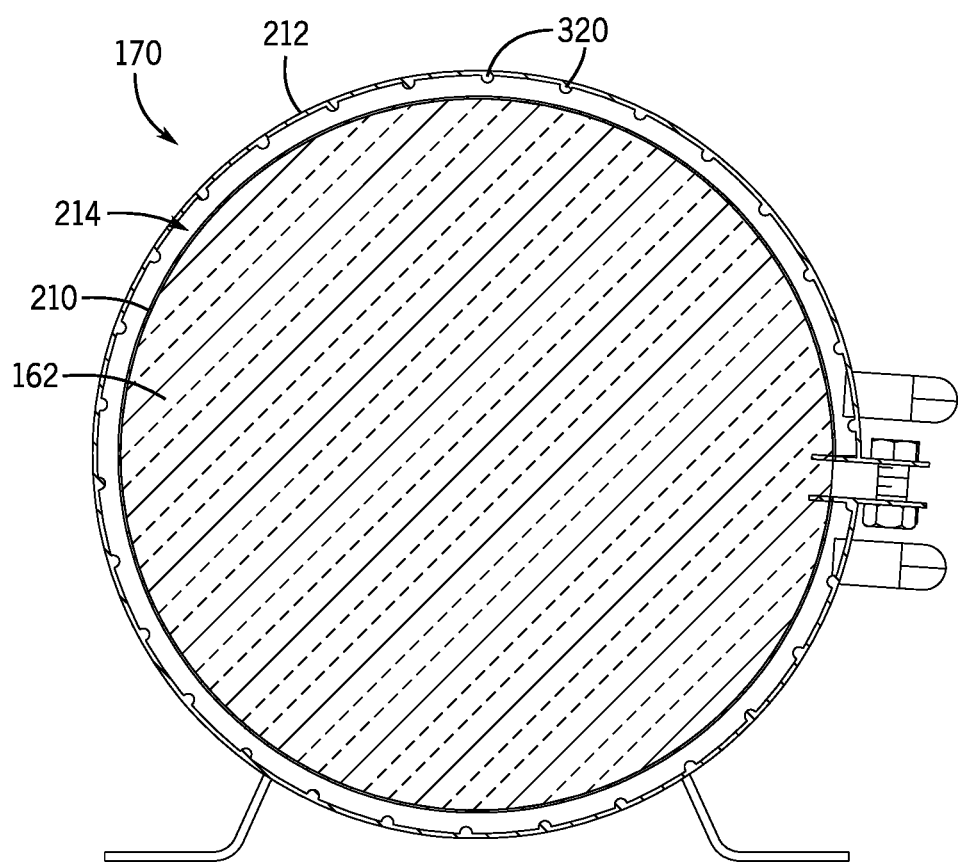
FIG. 11 is an axial cross-sectional view of an embodiment of a motor with a jacket disposed about the motor, in accordance with an aspect of the present disclosure.

FIG. 11 is an axial cross-sectional view of an embodiment of the motor 162 and the jacket 170. The outer shell 212 of illustrated embodiment of the jacket 170 includes surface formations 320 that extend within the cavity 214 from an inner surface of the outer shell 212. The surface formations 320 may improve heat transfer between the working fluid and the motor 162. For example, the surface formations 320 may induce turbulent flow of the working fluid within the cavity 214. The turbulent flow may increase heat absorption by the working fluid to increase cooling of the motor 162. Thus, the surface formations 320 may further improve performance of the HVAC system 150. As an example, the surface formations 320 may include dimples, ribs, punches, louvers, lances, cutouts, etchings, extrusions, extensions, another suitable feature, or any combination thereof, to induce turbulent flow of the working fluid within the cavity 214. Additionally, although the outer shell 212 includes the surface formations 320 in the illustrated embodiment, the inner shell 210 may additionally or alternatively include the surface formations 320 that extend into the cavity 214.

Figure 12:
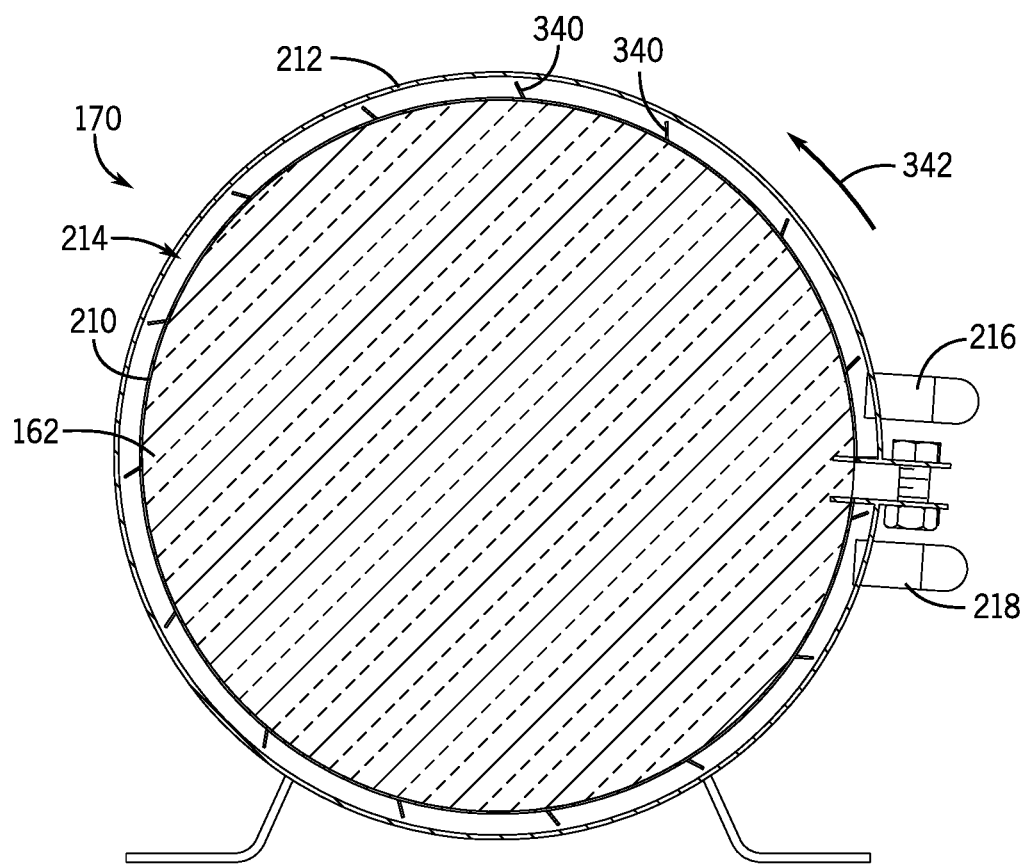
FIG. 12 is an axial cross-sectional view of an embodiment of a motor with a jacket disposed about the motor, in accordance with an aspect of the present disclosure.

FIG. 12 is an axial cross-sectional view of an embodiment of the motor 162 and the jacket 170. The illustrated jacket 170 includes ribs or fins 340 that extend into the cavity 214 from the inner shell 210 toward the outer shell 212. The ribs 340 may improve heat exchange between the motor 162 and the working fluid within the cavity 214 by increasing a surface area of heat transfer between the working fluid and the motor 162. That is, the ribs 340 may promote heat transfer from the motor 162 to the jacket 170 and from the jacket 170 to the working fluid, thereby improving cooling of the motor 162.

The ribs 340 may be formed to define a space between the ribs 340 and the outer shell 212 (e.g., an interior surface of the outer shell 212). That is, the ribs 340 may not fully extend from the inner shell 210 to contact the outer shell 212. The space may enable the working fluid to flow across the ribs 340 and be directed through the cavity 214 (e.g., from the inlet port 216 to the outlet port 218). In certain embodiments, the ribs 340 may be angled (e.g., obliquely angled) relative to the inner shell 210 to facilitate flow of the working fluid through the cavity 214. Indeed, the ribs 340 may be angled in a direction that guides the working fluid along a flow direction 342 through the cavity 214. As an example, the ribs 340 may be oriented at a 50 degree angle, at a 60 degree angle, at a 70 degree angle, at an 80 degree angle, or at any suitable angle that may provide a desired flow resistance of the working fluid within the cavity 214, thereby enabling the working fluid to be directed through the cavity 214 and/or generating desired turbulence of the working fluid.

Figure 13:
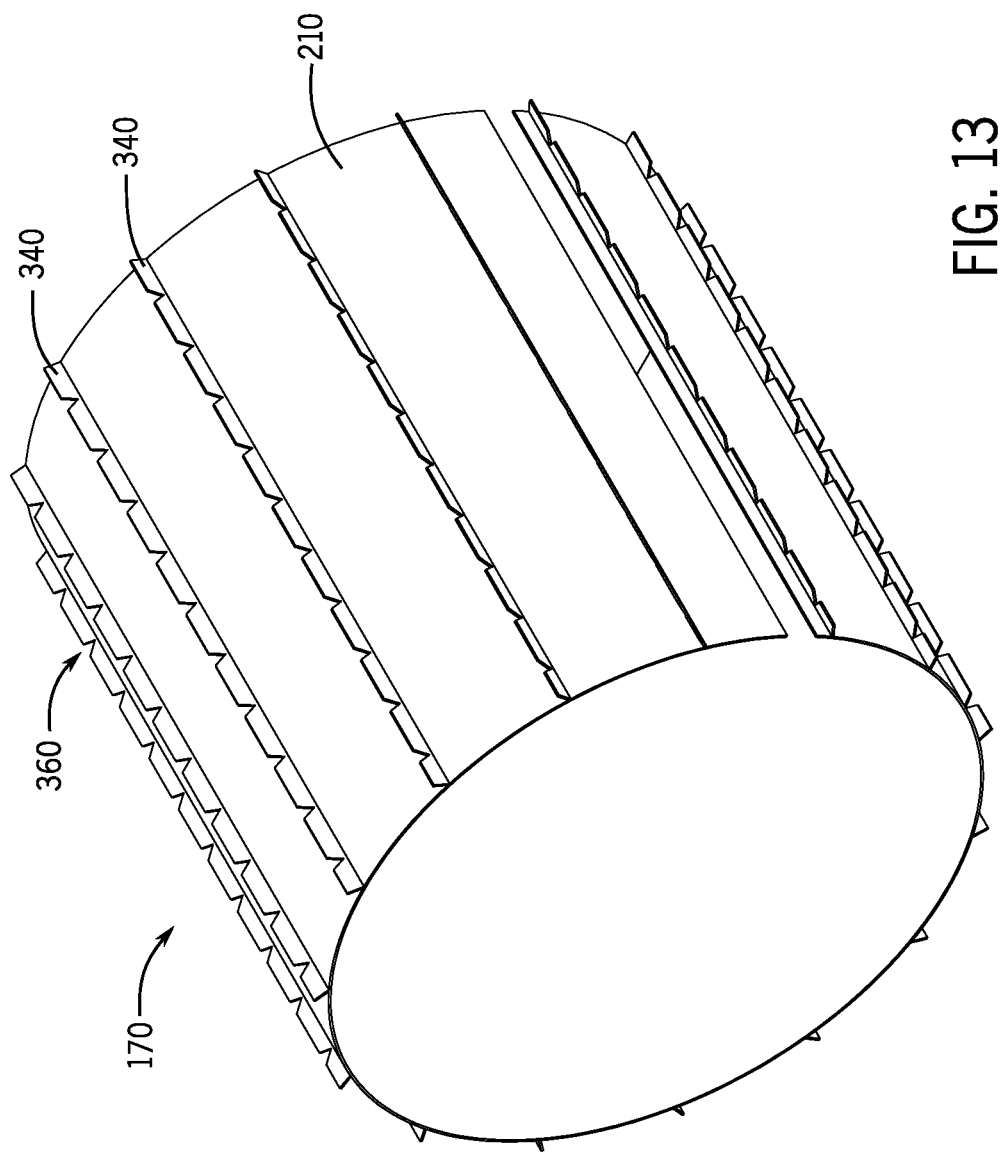
FIG. 13 is a perspective view of an embodiment of an inner shell of a jacket configured to be disposed about a motor, in accordance with an aspect of the present disclosure.

FIG. 13 is a perspective view of an embodiment of the inner shell 210 of the jacket 170. The illustrated jacket 170 also includes the ribs 340 that extend radially outward from the inner shell 210 and increase heat exchange between the working fluid and the motor 162. Each of the ribs 340 may include a notch and/or a cutout 360 that enables the working fluid to flow between adjacent ribs 340. That is, the working fluid may flow across or through the ribs 340 via the notches 360 to flow through the cavity 214. For example, portions of each rib 340 may extend (e.g., perpendicularly relative to the inner shell 210) to abut or contact the outer shell 212. Thus, such portions of the ribs 340 may block flow of the working fluid across the ribs 340. The notches 360 may be formed to enable the flow of working fluid between the ribs 340. For instance, the notches 360 may include a triangular shape, a circular shape, a rectangular shape, an oval shape, another suitable shape, or any combination thereof, to enable the working fluid to flow at a sufficient or desirable rate through the cavity 214.

The present disclosure may provide one or more technical effects useful in the operation of an HVAC system. For example, the HVAC system may condition a supply air flow and direct the supply air flow to a space to condition the space. The HVAC system may include a motor that is disposed along a flow path of a supply air flow. Thus, the motor may exchange heat with the supply air flow during operation of the HVAC system. A jacket may be disposed about the motor to provide cooling the motor and mitigate an impact of the heat exchange between the motor and the supply air flow on performance of the HVAC system. As an example, the jacket may place a working fluid in a heat exchange relationship with the motor to absorb heat from the motor. In this manner, in a cooling mode of the HVAC system in which the supply air flow is cooled, the jacket may reduce heat transfer from the motor to the supply air flow, thereby improving a cooling capacity of the supply air flow. In a heating mode of the HVAC system in which the supply air flow is heated and may transfer heat to the motor, the jacket may cool the motor and maintain a temperature of the motor below a threshold or desirable temperature. As a result, the motor may perform more efficiently and may enable the HVAC system to operate more efficiently (e.g., reduce energy consumption of the HVAC system during operation). The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and/or air conditioning (HVAC) unit, comprising:
    a heat exchanger;
    an inlet conduit configured to direct a working fluid to the heat exchanger;
    a motor configured to drive a component of the HVAC unit;
    a jacket disposed about the motor and comprising a cavity defined by a housing of the jacket, wherein the jacket is configured to receive a portion of the working fluid and to place the portion of the working fluid in a heat exchange relationship with the motor; and
    an additional conduit extending from the inlet conduit and configured to direct the portion of the working fluid from the inlet conduit to the cavity.

2. The HVAC unit of claim 1, wherein the jacket comprises a plurality of inlets configured to receive the portion of the working fluid, a plurality of outlets configured to discharge the portion of the working fluid from the cavity, or both.

3. The HVAC unit of claim 1, wherein the housing of the jacket comprises a first circumferential end and a second circumferential end, and the first circumferential end and the second circumferential end are compressed toward one another to secure the jacket about the motor.

4. The HVAC unit of claim 1, wherein the heat exchanger is configured to place the working fluid in a heat exchange relationship with a refrigerant circulated through the HVAC unit.

5. The HVAC unit of claim 4, wherein the heat exchanger is a condenser configured to circulate the refrigerant and transfer heat from the refrigerant to the working fluid.

6. The HVAC unit of claim 1, wherein the housing of the jacket comprises an inner shell and an outer shell offset from the inner shell to define the cavity, the inner shell is in contact with the motor, and the additional conduit extends from the inlet conduit to the outer shell to fluidly couple the inlet conduit with the cavity.

7. The HVAC unit of claim 6, wherein the outer shell, the inner shell, or both comprises surface formations extending into the cavity to direct the portion of the working fluid through the cavity.

8. The HVAC unit of claim 6, wherein the jacket comprises a rib extending from the inner shell toward the outer shell within the cavity.

9. The HVAC unit of claim 8, wherein the rib extends from the inner shell at an oblique angle.

10. The HVAC unit of claim 8, wherein the rib comprises a notch configured to enable flow of the portion of the working fluid across the rib within the cavity.

11. A heating, ventilation, and/or air conditioning (HVAC) unit, comprising:
- an inlet conduit configured to receive a working fluid and to direct the working fluid to a heat exchanger of the HVAC unit;
- a motor configured to drive a fan of the HVAC unit;
- a jacket disposed about the motor, wherein the jacket comprises an inner shell and an outer shell offset from one another to define a cavity of the jacket; and
- a first conduit extending from the inlet conduit to the cavity and configured to divert a portion of the working fluid to the cavity, wherein the cavity is configured to receive the portion of the working fluid from the first conduit, and the jacket is configured to place the motor in a heat exchange relationship with the portion of the working fluid.

12. The HVAC unit of claim 11, comprising an outlet conduit configured to receive the working fluid discharged from the heat exchanger, wherein the outlet conduit is fluidly coupled to the cavity of the jacket.

13. The HVAC unit of claim 11, comprising the heat exchanger, wherein the heat exchanger is configured to receive the working fluid via the inlet conduit and to place the working fluid in a heat exchange relationship with a refrigerant circulated through the HVAC unit.

14. The HVAC unit of claim 11, wherein the jacket comprises a partition extending from the inner shell to the outer shell to define a first pass and a second pass within the cavity, wherein the partition comprises an opening to enable flow of the portion of the working fluid between the first pass and the second pass.

15. The HVAC unit of claim 11, comprising the fan, wherein the motor is configured to drive the fan to direct a supply air flow along an air flow path through the HVAC unit, and the motor is disposed within the air flow path.

16. A heating, ventilation, and/or air conditioning (HVAC) unit, comprising:
- an inlet conduit configured to direct a working fluid to a heat exchanger of the HVAC unit;
- a motor configured to drive operation of a component of the HVAC unit;
- a jacket disposed about the motor and comprising a cavity defined by a housing of the jacket; and
- an additional conduit fluidly coupling the cavity of the jacket with the inlet conduit, wherein the additional conduit is configured to direct a portion of the working fluid from the inlet conduit into the cavity.

17. The HVAC unit of claim 16, comprising a valve disposed along the additional conduit and a control system communicatively coupled to the valve, wherein the control system is configured to adjust a position of the valve to control a flow rate of the portion of the working fluid into the cavity via the additional conduit.

18. The HVAC unit of claim 17, wherein the control system is configured to control the position of the valve based on a temperature of the motor, a temperature of the working fluid, a temperature of a supply air flow directed through the HVAC unit, the flow rate of the portion of the working fluid through the additional conduit, or any combination thereof.

19. The HVAC unit of claim 16, comprising a valve disposed along the inlet conduit, wherein the valve is configured to transition between an open position to enable a flow of the working fluid to the heat exchanger and a closed position to block the flow of the working fluid to the heat exchanger.

20. The HVAC unit of claim 19, wherein the additional conduit is configured to direct the portion of the working fluid from the inlet conduit into the cavity while the valve is in the closed position.

* * * * *